US009458924B2

(12) United States Patent
Northall

(10) Patent No.: US 9,458,924 B2
(45) Date of Patent: Oct. 4, 2016

(54) ELECTRIC SELECTOR CONTROL SYSTEM AND RELATED METHOD

(71) Applicant: Jaguar Land Rover Limited, Coventry (GB)

(72) Inventor: David Northall, Coventry (GB)

(73) Assignee: Jaguar Land Rover Limited (GB)

( * ) Notice: Subject to any disclaimer, the term of this patent is extended or adjusted under 35 U.S.C. 154(b) by 358 days.

(21) Appl. No.: 14/354,075

(22) PCT Filed: Oct. 29, 2012

(86) PCT No.: PCT/EP2012/071413
§ 371 (c)(1),
(2) Date: Apr. 24, 2014

(87) PCT Pub. No.: WO2013/060895
PCT Pub. Date: May 2, 2013

(65) Prior Publication Data
US 2014/0292078 A1    Oct. 2, 2014

(30) Foreign Application Priority Data
Oct. 27, 2011 (GB) .................................. 1118624.4

(51) Int. Cl.
| B60L 1/00 | (2006.01) |
| F16H 59/02 | (2006.01) |
| F16H 59/08 | (2006.01) |
| B60L 3/00 | (2006.01) |
| B60L 11/18 | (2006.01) |
| F16H 61/22 | (2006.01) |

(52) U.S. Cl.
CPC ................. F16H 59/02 (2013.01); B60L 3/00 (2013.01); B60L 3/0023 (2013.01);
(Continued)

(58) Field of Classification Search
CPC ....... B60L 11/1818; B60L 3/00; F16H 59/02
USPC ......................................................... 307/10.1
See application file for complete search history.

(56) References Cited

U.S. PATENT DOCUMENTS 5,919,112 A * 7/1999 Michael ................ F16H 63/483
                                                                477/99
5,984,706 A * 11/1999 Kakuta ............... B60L 11/1818
                                                                439/310
(Continued)

FOREIGN PATENT DOCUMENTS

| CN | 1297409 A | 5/2001 |
| CN | 1763403 A | 4/2006 |

(Continued)

OTHER PUBLICATIONS

Notification of First Office Action, Chinese Application No. 201280059296.3, Aug. 4, 2015, 20 pages.

*Primary Examiner* — Jared Fureman
*Assistant Examiner* — Alfonso Perez Borroto
(74) *Attorney, Agent, or Firm* — Myers Bigel & Sibley

(57) ABSTRACT

The present invention relates to an electric selector control system (5) for a vehicle having an electric drive motor and a battery. The electric selector control system (5) has a drive selector for selecting a vehicle drive mode. A control unit (1) is configured to receive a connection signal to indicate that the vehicle is connected to a charging station. Also, the electric selector control system (5) has a shield for inhibiting operation of the drive selector when the control unit (1) determines that the vehicle is connected to a charging station. The electric selector control system (5) can be combined with a transmission control module (11). The invention also relates to a method of operating an electric selector control system (5).

14 Claims, 2 Drawing Sheets

(52) U.S. Cl.
CPC ....... *B60L 11/1818* (2013.01); *B60L 11/1846* (2013.01); *F16H 59/08* (2013.01); *F16H 61/22* (2013.01); *B60L 2240/12* (2013.01); *B60L 2240/486* (2013.01); *B60L 2250/10* (2013.01); *B60L 2250/16* (2013.01); *B60L 2250/24* (2013.01); *B60Y 2300/91* (2013.01); *F16H 2059/081* (2013.01); *F16H 2059/082* (2013.01); *F16H 2061/223* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS 6,283,781 B1 * 9/2001 Mori .................. B60L 11/1818
439/310

2010/0072946 A1 * 3/2010 Sugano ................ B60L 3/0046
320/108
2010/0204865 A1 * 8/2010 Nakamura ................ B60L 3/00
701/22
2011/0171850 A1 * 7/2011 Brown, II ........... B60L 11/1818
439/372
2011/0227714 A1    9/2011 Kamaga
2012/0252628 A1 * 10/2012 Tsutsumi ................ B60L 11/14
477/19

FOREIGN PATENT DOCUMENTS

| CN | 102656392 A | 9/2012 |
| --- | --- | --- |
| DE | 10 2008 039955 | 3/2010 |
| EP | 1628047 A1 | 2/2006 |
| GB | 2423800 A | 9/2006 |
| GB | 2441337 A | 3/2008 |
| JP | H05-178109 A | 7/1993 |
| JP | 09322313 | 12/1997 |
| JP | 2008-284952 A | 11/2008 |
| JP | 2010-226840 A | 7/2010 |
| WO | WO 2011/064634 | 6/2011 |

* cited by examiner

ELECTRIC SELECTOR CONTROL SYSTEM AND RELATED METHOD

RELATED APPLICATIONS

This application is a 35 U.S.C. §371 national stage application of PCT Application No. PCT/EP2012/071413, filed on Oct. 29, 2012, which claims priority from Great Britain Patent Application No. 1118624.4, filed Oct. 27, 2011, the contents of which are incorporated herein by reference in their entireties. The above-referenced PCT International Application was published in the English language as International Publication No. WO 2013/060895 A2 on May 2, 2013.

TECHNICAL FIELD

The present invention relates to an electric selector control system for a vehicle having an electric drive motor and a battery. The present invention also relates to a method of operating an electric selector control system.

BACKGROUND

Some hybrid and electric motor vehicles are provided with a charging socket to be connected to a charging station to charge the on-board battery. While the vehicle is charging it is physically connected to the charging station and the vehicle may display a message to notify the driver that the vehicle is being charged. However, if this message is overlooked, the driver may attempt to drive the vehicle while it is connected to the charging station. This may result in damage to the vehicle and/or the charging station.

The present invention sets out to address the above problem which arises when vehicles are connected to a charging station.

SUMMARY OF THE INVENTION

According to one aspect of the present invention there is provided an electric selector control system for a vehicle having an electric drive motor and a battery, the electric selector control system comprising a drive selector for selecting a vehicle drive mode, a control unit configured to receive a connection signal to indicate that the vehicle is connected to a charging station, an actuator operable to displace the drive selector between an active position and an inactive position when the control unit receives said connection signal, and a shield arranged to inhibit operation of the drive selector when the drive selector is in said inactive position.

According to a second aspect of the invention there is provided an electric selector control system for a vehicle having an electric drive motor and a battery, the electric selector control system comprising: a drive selector for selecting a vehicle drive mode; a control unit configured to receive a connection signal to indicate that the vehicle is connected to a charging station; an actuator operable to displace the drive selector between an active position and an inactive position; and a shield arranged to inhibit operation of the drive selector when the drive selector is in said inactive position. The actuator is further operable to retain the drive selector in the inactive position when the ignition is turned on, if the control unit receives said connection signal.

In an embodiment according to the second aspect, the actuator may be operable to displace the drive selector between an active position and an inactive position when the control unit receives said connection signal.

In embodiments according to the second aspect, the actuator is typically operable to displace the drive selector between an inactive position and an active position when the ignition is turned on, if the control unit does not receive said connection signal, or some other relevant signal such as a fault signal.

In some embodiments of the two aspects above, the drive selector remains operable to select at least one vehicle drive mode when the vehicle is connected to a charging station.

According to another aspect of the present invention there is provided an electric selector control system for a vehicle having an electric drive motor and a battery; the electric selector control system comprising a drive selector for selecting a vehicle drive mode, a control unit configured to receive a connection signal to indicate that the vehicle is connected to a charging station, a shield for inhibiting operation of the drive selector when the control unit receives said connection signal and an actuator operable to displace the drive selector between an active position and an inactive position. The actuator displaces the drive selector to said inactive position when the control unit receives a connection signal indicating that the vehicle is connected to a charging station; the shield inhibiting operation of the drive selector when the drive selector is in said inactive position. The drive selector is still enabled to carry out transmission range changes or to select a drive mode when the vehicle is connected to a charging station.

According to another aspect of the present invention there is provided an electric selector control system for a vehicle having an electric drive motor and a battery; the electric selector control system comprising a drive selector for selecting a vehicle drive mode, a control unit configured to receive a connection signal to indicate that the vehicle is connected to a charging station, and an actuator operable to displace the drive selector between an active position and an inactive position when the control unit receives said connection signal. The electric selector control system may further comprise means for inhibiting operation of the drive selector when the control unit receives said connection signal, such as a shield or a functionally equivalent structure.

The drive selector may be operated by a user (typically the vehicle driver) to select a drive mode, such as Park, Reverse, Neutral, Drive or Sport. The control unit may be suitable for controlling the drive selector and/or the shield. During normal operation, the control unit generates a drive mode signal to request a change in the drive mode in response to user inputs via the drive selector. When the vehicle is connected to a charging station, the control unit is configured to operate the shield to inhibit operation of the drive selector by the user. The shield can restrict or prevent operation of the drive selector. The shield can limit or prevent access to the drive selector. The shield can be any suitable means for inhibiting the operation of the drive selector.

The drive selector can be a mechanical selection device movable to a position (i.e. Park, Reverse, Neutral, Drive or Sport) corresponding to an operating mode of the vehicle's transmission. The drive selector can be a control wheel rotatable by a user to select the vehicle operating mode. The control wheel has a sidewall which can provide an engagement surface to be gripped by the user. One or more detents could be provided in the sidewall or an upper surface of the control wheel for engagement by the driver. The drive selector can be mounted in a housing or casing, for example a centre console of the vehicle.

The drive selector could optionally be physically locked in a predetermined position, for example in a Park position, when the connection signal is received. However, by deploying the shield to inhibit operation of the drive selector the vehicle can be prevented from being driven without physically locking the drive selector.

The drive selector can have an active position and an inactive position. When in said active position, the drive selector is accessible. When in said inactive position, the shield can limit access to the drive selector.

The drive selector could be retracted when in said inactive position; and extended when in said active position. For example, the drive selector could be raised so as to project above a housing when in said active position; and lowered partially or completely into the housing when in said inactive position. In the inactive position, the housing can act as the shield for limiting access to the drive selector.

The shield can be moveable to limit or prevent access to the drive selector. For example, the shield could be deployed partially or completely to cover the drive selector. Equally, the shield could be retracted to provide access to the drive selector. For example, a section of a housing or console provided around the drive selector could be retracted to provide access to the drive selector. When said section of the housing or console is not retracted, it serves as the shield to inhibit operation of the drive selector.

A combination of a moveable shield and a moveable drive selector could be employed. An actuator can be provided to displace the drive selector and/or the shield. The actuator can be controlled by the control unit.

A drive mechanism can be provided for displacing the drive selector to a position representative of a current drive mode. The drive mechanism can be controlled by said control unit, for example in response to signals from a transmission controller, for example to displace the drive selector to a Park position.

The connection signal indicates that the vehicle is physically connected to a charging station. The connection signal can, for example, be generated by a battery control module. A disconnected signal may be generated when the vehicle is disconnected form the charging station. Alternatively, the absence of said connection signal may be used to indicate that the vehicle is not connected to the charging station.

In use, the control unit can receive a vehicle speed signal, for example from an anti-lock brake control module via a Controller-Area Network (CAN) bus. The control unit can generate a fault signal if the vehicle speed signal is indicative of a speed above a predetermined threshold when the connection signal indicates that the vehicle is connected to a charging station. The control unit may terminate a charge cycle if a fault is detected.

The transmission controller controls the vehicle's transmission and may optionally engage a Park drive mode when the connection signal is received. The transmission controller could lock the transmission in said Park drive mode when the connection signal is received.

The present invention can relate to a transmission control module for a vehicle, the transmission control module comprising an electric selector control system as described herein. The electric selector control system can be connected to a CAN bus for receiving data relating to the operational state of the vehicle, such as the vehicle speed.

The CAN bus can be connected to a battery control module. The battery control module can generate the connection signal when the vehicle is connected to a charging station. The battery control module can comprise a sensor for detecting when the battery is being charged. Alternatively, the battery control module can comprise a switch or sensor to detect when a cable has been attached to a charging socket. In a further alternative, the charging station may output a connection signal, for example using a wireless transmitter, to be detected by the vehicle.

The CAN bus can be connected to a transmission controller for selecting a vehicle drive range in a transmission. The transmission controller can engage a Park mode when the vehicle is connected to a charging station. The transmission controller may output a range position signal to the control unit to indicate that the Park mode has been engaged. The transmission controller may output a range position signal to notify the control unit that the Park mode has been engaged.

In another aspect, the present invention relates to a method of operating an electric selector control system for a vehicle, wherein the vehicle comprises an electric drive motor and a battery; and the electric selector control system comprises a user-operated drive selector for selecting a drive mode, the method comprising inhibiting selection of a drive mode when the vehicle is connected to a charging station. Inhibiting selection of the drive mode comprises displacing the drive selector to an inactive position.

In another aspect, the present invention relates to a method of operating an electric selector control system for a vehicle, wherein the vehicle comprises an electric drive motor and a battery, and the electric selector control system comprises a user-operated drive selector for selecting a drive mode and an actuator for displacing the selector between an inactive position, in which operation of the selector by a user is hindered or substantially prevented, and an active position in which operation of the selector by a user is permitted. The method comprises: displacing the drive selector from the inactive position to the active position when the vehicle ignition is switched on if the vehicle is not connected to a charging station, but maintaining the drive selector in the inactive position when the ignition is turned on if the vehicle is connected to a charging station.

In either of the two methods described above, it may be that the drive selector is still enabled to carry out transmission range changes when the vehicle is connected to a charging station.

The method can comprise shielding the drive selector to inhibit selection of the drive mode. The shielding can partially or completely restrict or prevent operation of the drive selector.

The step of inhibiting selection of a drive mode may comprise one or more of the following:
(i) locking the drive selector in an inactive position;
(ii) displacing a shield to an engaged position;
(iii) hiding or obscuring a drive selector indicia; and
(iv) operating a transmission controller to inhibit drive mode selection.

The method can comprise the additional step of displacing the drive selector to a Park position when the vehicle is connected to a charging station. The method may also include disabling the drive selector when the vehicle is connected to a charging station.

The drive selector can, for example, be a rotary wheel, a lever, or one or more paddles.

The present invention has particular application in a motor vehicle. The transmission controller is suitable for controlling the vehicle transmission, for example an automatic transmission.

The electric drive motor described herein is intended to provide drive for the vehicle (i.e. motive force to propel the vehicle). The electric drive motor may be used in conjunction with an internal combustion engine in a hybrid vehicle. Alternatively, the vehicle may be an electric vehicle propelled exclusively by said electric drive motor. More than one electric drive motor may be provided.

The method(s) described herein can be implemented on a computational device comprising one or more processors, such as an electronic microprocessor. The processor(s) can be configured to perform computational instructions stored in memory or in a storage device. The controllers and/or control units described herein can comprise one or more processors configured to perform computational instructions. The present invention also relates to a computer program for controlling a processor, the computer program being executable to cause the processor to operate in accordance with the method(s) described herein.

Within the scope of this application it is envisaged that all of the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the present invention will now be described, by way of example only, with reference to the accompanying Figures, in which.

DETAILED DESCRIPTION

Figure 1:
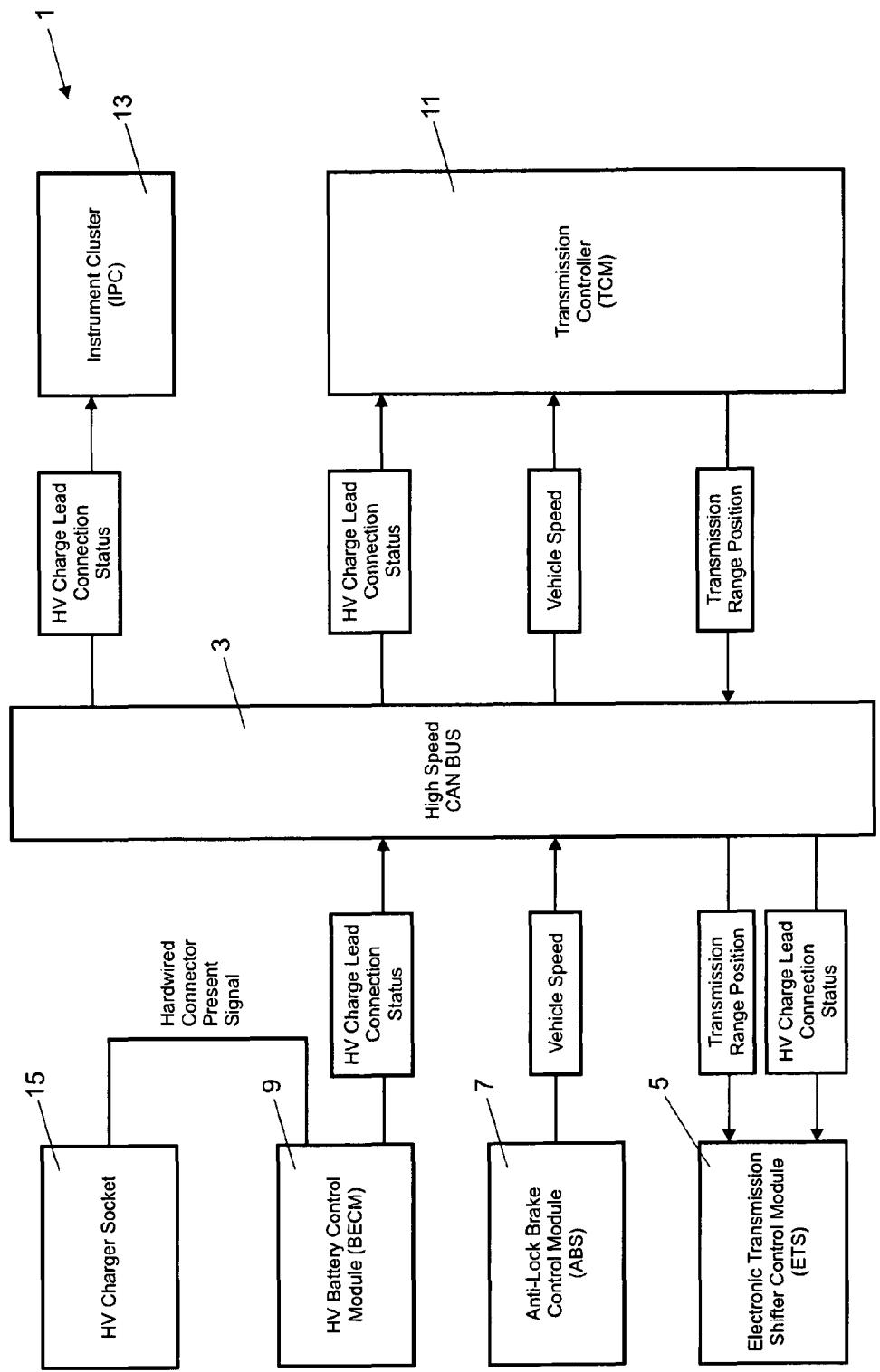
FIG. 1 shows a schematic representation of a control system for a motor vehicle according to the present invention.

A control system 1 according to the present invention is illustrated schematically in FIG. 1. The control system 1 controls an automatic transmission of a hybrid motor vehicle comprising at least one electric drive motor, a battery for powering the electric drive motor, and an internal combustion engine. The control system 1 implements a safety protocol to prevent the vehicle being driven when it is connected to a charging station.

The control system 1 comprises a high speed Controller-Area Network (CAN) bus 3 connected to an electronic transmission shifter (ETS) 5, an anti-lock brake control module (ABS) 7, a HV battery control module (BECM) 9, a transmission controller (TCM) 11 and an instrument cluster (IPC) 13. The battery control module 9 is connected to a HV charger socket 15 for connection to a charging station to charge the battery.

The electronic transmission shifter 5 comprises a user-operated drive selector (not shown) for selecting an operating mode of the transmission (i.e. Park, Drive, Neutral, Sport and Reverse). The drive selector is movable to a series of positions corresponding to the operating modes of the transmission. When a user moves the drive selector to select an operating mode, a signal is sent from the electronic transmission shifter 5 to the transmission controller 11 to request that the transmission changes to the selected operating mode. A drive mechanism (not shown) may also be provided to move the drive selector to a position representative of the current operating mode of the transmission.

The drive selector in the illustrated embodiment is a rotary wheel movable between an active position where it is readily accessible to the driver, and an inactive position where it is at least partially shielded so as to be less accessible to the driver. In the active position, the drive selector is raised so as to project out of a centre console. Conversely, in the inactive position, the drive selector is lowered such that the top of the drive selector lies substantially flush with the centre console. Thus, the centre console at least partially shields the drive selector when the drive selector is in its inactive position, hindering or substantially preventing normal operation of the selector. A drive selector of this type is described in EP 1628047, GB 2441337 and GB 2423800 and the content of each of the published applications is incorporated herein in its entirety.

The electronic transmission shifter 5 controls a retractor actuator (not shown) operable to displace the drive selector between the active and inactive positions (for example when the ignition is turned on/off). The electronic transmission shifter 5 may also control the drive mechanism for the drive selector.

The operation of the control system 1 according to the illustrated embodiment of the present invention will now be described.

The anti-lock brake control module 7 supplies vehicle speed data to the CAN bus 3 where it can be accessed by the transmission controller 11 to set an operating range for the transmission. The transmission controller 11 outputs range position data (Transmission_Range_Position) to the CAN bus 3 to indicate the current operating mode of the transmission.

The battery control module 9 is connected to the charger socket 15 and monitors the charging of the battery for the electric drive motor. The charger socket 15 comprises a sensor which outputs a signal (Hardwired_Connector_Present_Signal) to the battery control module 9 when connected to a charging station. The sensor can, for example, detect the presence of a charging current; and/or could comprise a switch or contact which is operated when a charging cable is attached. Alternatively, or in addition, a connection signal could be transmitted by the charging station.

The battery control module 9 interprets the signal from the charger socket 15 and outputs a connection signal (Charge_Lead_Connection_Status) to indicate the status of the charger socket 15. The presence of the connection signal (Charge_Lead_Connection_Status) indicates that the charger socket 15 is connected to a charging station and the absence of the connection signal (Charge_Lead_Connection_Status) indicates that the charger socket 15 is not connected to a charging station. The connection signal (Charge_Lead_Connection_Status) is output to the CAN bus 3 and can be accessed by the electronic transmission shifter 5, the transmission controller 11 and the instrument cluster 13. It will be appreciated that a first connection signal could be used to indicate that the charger socket 15 is connected and a second connection signal (different from the first connection signal) could be used to indicate that the charger socket 15 is not connected.

The electronic transmission shifter 5 and the transmission controller 11 both interrogate the CAN bus 5 to determine when the charger socket 15 is connected to a charging station. When a connection signal (Charge_Lead_Connection_Status) is detected, the transmission controller 11 deselects any current drive gear and engages Park in the transmission. Once Park is engaged, the transmission controller 11 sends range position data (Transmission_Range_Position) to the electronic transmission shifter 5 via the CAN bus 3 to indicate that Park is engaged. Optionally, the transmission controller 11 can inhibit subsequent gear selection for a defined period of time or until no connection signal (Charge_Lead_Connection_Status) is detected indicating that the charger socket 15 is not connected to a charging station.

When the electronic transmission shifter 5 receives notification that the vehicle is connected to a charging station and that the transmission is in Park, a control sequence is initiated to shield the drive selector but does not disable transmission range (PRND) changes. The electronic transmission shifter 5 determines the current position of the drive selector and, if appropriate, engages the drive mechanism to rotate the drive selector to the Park position. Similarly, the electronic transmission shifter 5 determines whether the drive selector is currently in an active or an inactive position and, if appropriate, engages the retractor actuator to displace the drive selector to said inactive position. The drive mechanism and the retractor actuator can operate simultaneously or sequentially to move the drive selector to its Park position and its inactive position.

With the drive selector in its inactive position, the housing surrounding the drive selector serves as a shield for the drive selector and inhibits its operation by the driver. The driver does not have access to the sides of the drive selector and it is difficult to apply a turning force to the drive selector. While the driver is unable easily to grasp the drive selector when in the inactive position, by applying a downward force to, for example, the upper surface of the drive selector, the selector can be rotated into at least one drive mode by friction between the driver's hand and the selector. This allows the driver still to select a drive mode or transmission range other than park while the drive selector is in its inactive position, albeit with considerably greater difficulty than if the selector were in the active position. Nevertheless, this may be advantageous in the case of a fault wherein notification that the vehicle is connected to a charging station is supplied incorrectly. As an alternative, the electronic transmission shifter 5 may disable the drive selector such that drive mode or range change signals are not transmitted to the transmission controller 11.

A message, for example "VEHICLE CHARGING" and/or "VEHICLE CONNECTED", can be displayed on the instrument cluster 13 when the connection signal (Charge_Lead_Connection_Status) is detected.

As a precautionary measure the electronic transmission shifter 5 can perform fault analysis based on the data provided over the CAN bus 3. For example, if the vehicle speed data indicates that the vehicle is travelling at a speed above a predetermined threshold speed (for example 1 km/h or 3 km/h) and a positive connection signal (Charge_Lead_Connection_Status) is detected, a fault signal will be generated by the electronic transmission shifter 5. The fault signal can be output to the CAN bus 3 and, optionally, a fault message displayed on the instrument cluster 13.

Figure 2:
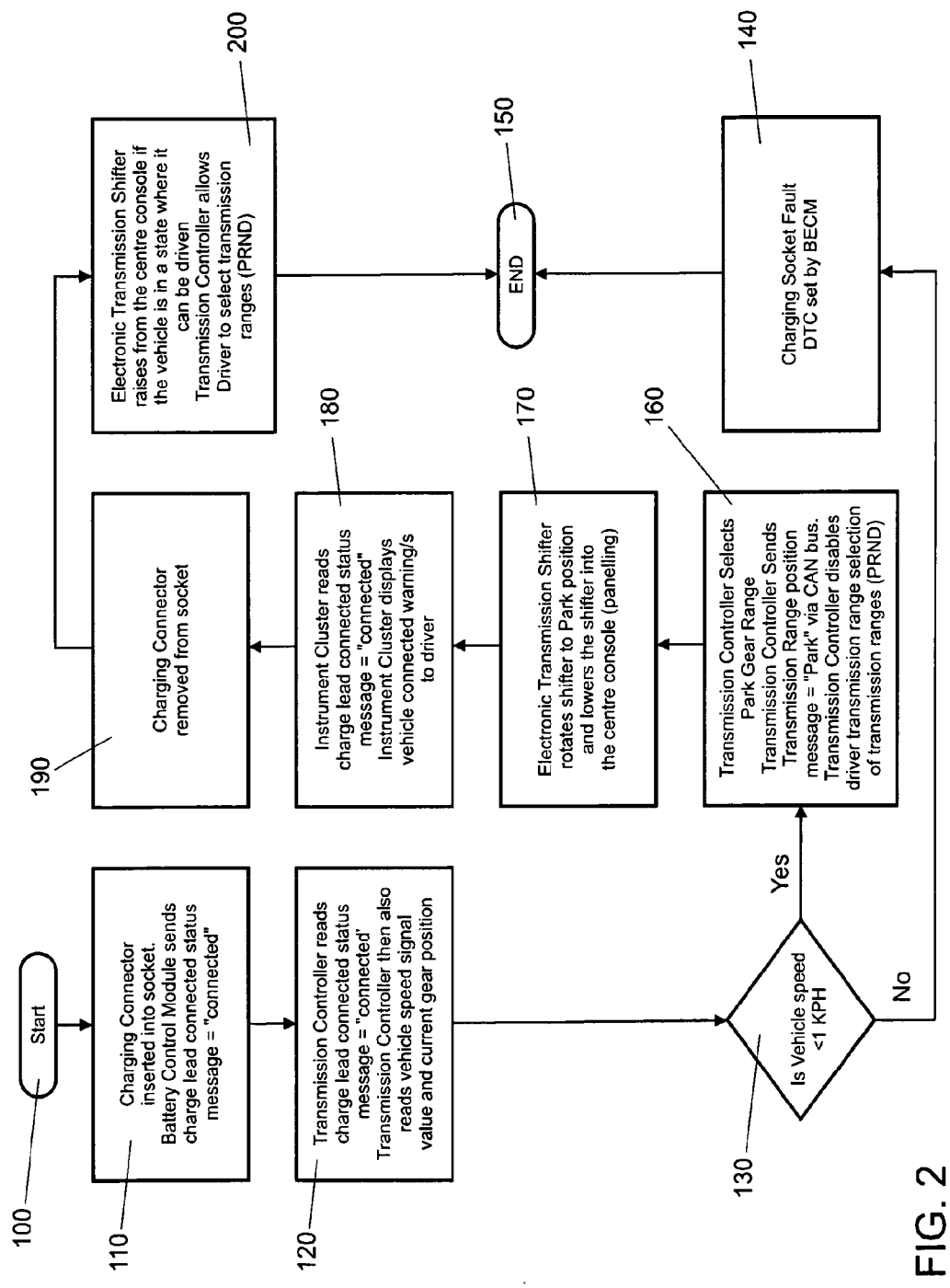
FIG. 2 shows a flow diagram of the operational steps for the control system according to the present invention.

The operation of the electronic transmission shifter 5 will be described with reference to the flowchart shown in FIG. 2.

The process starts (STEP 100). A charging connector is inserted into the charging socket 15 and the battery control module 13 sends a charge lead connected status message "CONNECTED" (STEP 110). The connection signal (Charge_Lead_Connection_Status) is output to the CAN bus 3.

The transmission controller 11 reads the charge lead connected status message "CONNECTED" along with the vehicle speed signal and the current gear position (STEP 120). The vehicle speed is measured by the anti-lock brake control module 7 and the vehicle speed signal output to the CAN bus 3. The current gear position is stored in the transmission controller 11 and output to the CAN bus 3 so that it is available for the electronic shifter module 5.

The transmission controller 11 then performs a check to determine if the vehicle speed is below a defined threshold of 1 km/h (STEP 130).

If the transmission controller 11 determines that the vehicle speed is greater than the defined threshold, a charging socket fault is set by the control system 1 (STEP 140). The charging socket fault can be logged and/or a fault message displayed on the instrument cluster 13. If a fault is detected, the process is terminated (STEP 150).

If the transmission controller 11 determines that the vehicle speed is less than the defined threshold the process continues. The transmission controller 11 selects a Park gear range and a transmission range position message "PARK" is output via the CAN bus 3 (STEP 160). The transmission controller does not disable driver transmission range selection of transmission ranges (PNRD).

The electronic shifter module 5 receives the transmission range position message "PARK" and activates the retractor actuator and the drive mechanism. The electronic shifter module 5 rotates the drive selector to the Park position and lowers the drive selector into the centre console panelling (STEP 170).

The instrument cluster 13 reads the charge lead connected status message "CONNECTED" and displays a vehicle connected warning to the driver (STEP 180).

The battery is then charged in conventional manner. The charging connector is removed from the socket 15 (STEP 190). The connection signal is no longer output from the battery control module 9 and the electronic transmission shifter 5 and the transmission control 11 identify that the vehicle is no longer connected to a charging station.

The electronic shifter module 5 raises the drive selector from the centre console if the vehicle is in a state where it can be driven and the transmission controller 11 allows the selection of a transmission range (PRND) by the driver (STEP 200).

The process is then terminated (STEP 150) to allow normal operation of the vehicle. The process is repeated when the charger socket 15 is next connected to a charging station.

The electronic transmission shifter 5 according to the illustrated embodiment controls the retractor actuator to lock the drive selector in an inactive position when the vehicle is connected to a charging station. In the inactive position, the drive selector is lowered into the central console and only the top of the drive selector is accessible. The driver is provided with a physical indication that the vehicle is connected to a charging station and should not be driven. The operation of the drive selector is thereby inhibited.

On the other hand, if the drive selector is in the retracted, inactive position, as it will normally be when the vehicle ignition is off, upon switching on of the ignition the drive selector is maintained in the inactive position if the positive connection signal (Charge_Lead_Connection_Status) is detected indicating that the vehicle is connected to a charging station. That is to say, the electronic shifter module 5 is configured to maintain the drive selector in the retracted, inactive position following ignition-on such that it is not displaced to the active position. This further provides a visible indication to the driver that the vehicle is connected to a charging station.

As mentioned above, in this retracted, inactive position the drive selector can still be rotated into at least one of the drive modes by pressing downwardly on the selector and applying a rotational torque through friction, since the selector cannot be grasped in this position. This facility allows the vehicle still to be driven in the event that an erroneous (Charge_Lead_Connection_Status) is received.

The electric selector control system according to the present invention has been described primarily with reference to automatic transmissions. It will be appreciated that the invention could be used in conjunction with semi-automatic and manumatic transmissions. Equally, the invention could be implemented in a manual transmission.

It will be appreciated that various changes and modifications can be made to the embodiment described herein without departing from the scope of the present invention. For example, although the invention has been described with reference to a hybrid powertrain, it could equally be implemented for an electric powertrain.

In addition, the drive selector is not necessarily a mechanical controller, such as a rotary wheel, paddle, switch or lever. For example, the drive selector could be implemented on a touch-sensitive screen or control panel. In an arrangement of this type, the shield could be engaged by deleting or obscuring (partially or completely) an icon illustrating a drive operating range (PRND). For example, a Drive or Reverse operating mode icon could be removed or shown in a greyed-out form when the charger socket 15 is connected to a charging station. In these arrangements, the shield is engaged to hide or obscure a drive selection option. Equally, a light source highlighting a drive operating mode could change colour or intensity; be turned off; partially or completely obscured when the shield is engaged.

The invention claimed is:

1. An electric selector control system for a vehicle having an electric drive motor and a battery, the electric selector control system comprising:
    a drive selector for selecting a vehicle drive mode;
    a control unit configured to receive a connection signal to indicate that the vehicle is connected to a charging station;
    an actuator operable to displace the drive selector between an active position and an inactive position when the control unit receives said connection signal; and
    a shield arranged to inhibit operation of the drive selector when the drive selector is in said inactive position,
    wherein the drive selector remains operable to select at least one vehicle drive mode when the connection signal is received.

2. The electric selector control system of claim 1, wherein the system is operable to maintain the drive selector in the inactive position when the ignition is turned on if the control unit receives said connection signal.

3. The electric selector control system of claim 1, wherein the drive selector is a control wheel rotatable by a user to select the vehicle drive mode.

4. The electric selector control system claim 1, comprising a drive mechanism for displacing the drive selector to a position representative of a current drive mode.

5. The electric selector control system of claim 4, wherein the drive mechanism displaces the drive selector to a Park position when the control unit receives a connection signal indicating that the vehicle is connected to a charging station.

6. The electric selector control system of claim 1, wherein the control unit generates a fault signal if a connection signal is received indicating that the vehicle is connected to a charging station when the vehicle's speed is above a predetermined threshold.

7. A transmission control module for a vehicle, the transmission control module comprising the electric selector control system of claim 1, and a CAN bus for receiving data relating to the operational state of the vehicle.

8. The transmission control module of claim 7, wherein the CAN bus is connected to a battery control module which outputs the connection signal to indicate that the vehicle is connected to a charging station.

9. The transmission control module of claim 7, wherein the CAN bus is connected to a transmission controller for selecting a vehicle drive range in a transmission.

10. The transmission control module of claim 7, wherein the transmission controller engages a Park operating mode when it receives a connection signal indicating that the vehicle is connected to a charging station.

11. A method of operating an electric selector control system for a vehicle, wherein the vehicle comprises an electric drive motor and a battery; and the electric selector control system comprises a user-operated drive selector for selecting a drive mode; the method comprising inhibiting selection of a drive mode when the vehicle receives a connection signal indicating that the vehicle is connected to a charging station,
    wherein inhibiting selection of the drive mode comprises displacing the drive selector to an inactive position and the drive selector is still enabled to carry out transmission range changes when the vehicle receives the connection signal.

12. The method of claim 11, further comprising:
    displacing the drive selector to an inactive position when an ignition is set to off; and
    retaining the drive selector in the inactive position when the ignition is turned on if the vehicle receives the connection signal.

13. The method of claim 11, wherein inhibiting selection of the drive mode comprises one or more of the following: (i) displacing a shield to an engaged position; and (ii) hiding or obscuring a drive selector indicia.

14. The method of claim 11, further comprising displacing the drive selector to a Park position when the vehicle receives the connection signal.

* * * * *

UNITED STATES PATENT AND TRADEMARK OFFICE
CERTIFICATE OF CORRECTION

| | | |
|---|---|---|
| PATENT NO. | : 9,458,924 B2 | Page 1 of 1 |
| APPLICATION NO. | : 14/354075 | |
| DATED | : October 4, 2016 | |
| INVENTOR(S) | : Northall | |

It is certified that error appears in the above-identified patent and that said Letters Patent is hereby corrected as shown below:

In the Claims
Column 10, Claim 4, Line 1: Please correct "system claim 1,"
to read -- system of claim 1, --

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*